(12) United States Patent
Brunet et al.

(10) Patent No.: US 6,430,613 B1
(45) Date of Patent: Aug. 6, 2002

(54) PROCESS AND SYSTEM FOR NETWORK AND SYSTEM MANAGEMENT

(75) Inventors: Jean Brunet, Betton; Florence Lamberet, La Celle Saint Cloud, both of (FR)

(73) Assignee: Bull, S.A., Louveciennes (FR)

( * ) Notice: Subject to any disclaimer, the term of this patent is extended or adjusted under 35 U.S.C. 154(b) by 0 days.

(21) Appl. No.: 09/292,561

(22) Filed: Apr. 15, 1999

(30) Foreign Application Priority Data

Apr. 15, 1998 (FR) .............................. 98 04695

(51) Int. Cl.[7] .......................................... G06F 15/173
(52) U.S. Cl. ....................... 709/223; 709/224
(58) Field of Search ............... 709/223, 224, 709/225, 220, 221

(56) References Cited

U.S. PATENT DOCUMENTS 5,185,860 A * 2/1993 Wu ............................ 709/224
5,651,006 A    7/1997 Fujino et al.
5,777,549 A * 7/1998 Arrowsmith et al. ....... 340/506

FOREIGN PATENT DOCUMENTS

EP          0777357       6/1997

OTHER PUBLICATIONS

Patent Abstracts of Japan, vol. 097, No. 008, Aug. 29, 1997 & JP 09101929 A (Hitachi Ltd; Hitachi Process Comput Eng. Inc.), Apr. 15, 1997, Abstract.

Siegl, M. R. et al.: "Hierarchical Network Management: A Concept and its Prototype in SnMPV2" Computer Networks and ISDN Systems, vol. 28, No. 4, Feb. 1, 1996, pp. 441–452, XP000553071.

* cited by examiner

Primary Examiner—Glenton B. Burgess
Assistant Examiner—Kimberly Flynn
(74) Attorney, Agent, or Firm—Miles & Stockbridge P.C.; Edward J. Kondracki

(57) ABSTRACT

The present invention relates to a process and a system for network and system management. The process for network management comprises at least one submanager (COACH) located in a containing tree between a main manager (AD) and the equipment units of a local area network. The submanager is located in the local area network (RLE) and is managed by the main manager (AD). A subnetwork comprises various modules that communicate with one another and with the main manager (AD) through a kernel (N). The modules poll the equipment of the subnetwork and receive the alarms sent by agents (SNMP) operating in the equipment units of the subnetwork.

27 Claims, 2 Drawing Sheets

PROCESS AND SYSTEM FOR NETWORK AND SYSTEM MANAGEMENT

FIELD OF THE INVENTION

The present invention relates to a process and a system for network and system management.

DESCRIPTION OF RELATED ART

Large companies have increasing numbers of equipment units to manage. These units, linked together by a communication network called a "Local Area Network" (RLE, LAN), are managed by a manager. In order to manage (monitor, operate, supervise, control) equipment remotely from one point, the architectural model comprising a manager, for example (ISM, FIG. 4) and an agent, for example of the SNMP type, is the one most commonly adopted. In this architectural model, the agents (SNMP), implemented in the equipment (ET) of the network, inform the manager of the status of each equipment unit managed. Whenever there is an equipment malfunction, an agent (SNMP) sends the manager ISM an alarm via the wide area network (WAN). In the great majority of cases, this manager manages several hundred equipment units distributed over one or more countries. The information exchanged between the manager and the equipment managed flows through a "Wide Area Network" (WAN). However, the network WAN has limited capacities and the transmission of information through this network is currently slow and uncertain. This problem is explained by the fact that the bandwidth of the network (WAN) is too small relative to the continually increasing amount of information passing through it between managers and their equipment. Local area networks often support traffic exceeding 10 megabits, while the network WAN has a bandwidth that is often less than or equal to 64 kilobits; 9600 baud is a common value. Consequently, the network (WAN) is overloaded and a lot of information is lost. Moreover, the transmission of the data is very slow and the type of transmission (in periodic small packets) is not adapted to the current modes of utilization of WANs. The processing of information by the manager is slowed down and the corrective actions to be initiated are delayed. Furthermore, in some cases, the chronology of the inflow of information to the manager is disrupted because of this excessive flow. In this case, the processing of this information can result in an incorrect interpretation of events, which can trigger inappropriate actions on the part of the manager. The cost of communications is also increased.

One solution to the problem of loss of information consists in that the manager ISM generates through the network (WAN), at a given time, a request with the format "Are you okay?" to each system being managed and the latter responds with "Yes, I'm okay?" This solution is very costly. It does not solve the problem of the overloading of the cables and further increases the flow of information through the network (WAN). Moreover, the request or the response to this request can be lost in the network (WAN).

Another solution consists of managing the flow of information using a tool such as the SM Monitor 6000 sold under the IBM trademark. This tool, strongly linked to the platform known as "System View," is remote and it makes it possible to concentrate the alarms of a network and to perform operations from information that can he supplied by the agents of the network. But SM Monitor 6000 consumes central processing unit (CPU) resources, and takes up a lot of memory space. Moreover, many companies today need to manage a large number of small networks. SM Monitor 6000 does not have a mechanism for large-scale deployment and therefore cannot be used to manage a large number of equipment units. Furthermore, SM Monitor 6000 uses a technology that is not very portable. The SM Monitor 6000 configuration can only be used with the "System View" platform, and is unusable without this tool.

One last solution, proposed by the company "BMC Software" consists of a control module that makes it possible to supervise a set of agents known as "Patrol agents." A Patrol agent can contain several modules, each having the function of gathering a certain type of information, such as the system information or the information of an application (for example, an Oracle database). This solution is not appropriate, because, even though the Patrol technology makes it possible to gather certain information in the equipment units, it is not designed to play a managerial role vis-a-vis the agents. The Patrol agent processes local data in one machine; it is only a source of information and it is not supplied with data originating from other agents. Moreover, the Patrol agents approach does not have the capacity to handle changes in the equipment, even though this is fundamental to operation. Furthermore, it uses up the CPU time and resources of the target systems because of the interpretive language technology.

SUMMARY OF THE INVENTION

The object of the present invention is to eliminate the drawbacks of the prior art by offering a portable network management process adapted to the management of a large number of equipment units. The process according to the invention limits and protects the administrative flow between the manager and the equipment managed by preventing the sending of unnecessary messages or the repeated sending of the same message through the network WAN. Thus, this process adapts to the saturation levels of the bandwidth and makes it possible to reduce the loss of information in the network (WAN). Moreover, as a result of this process, the information gathering frequencies can be adapted to each individual piece of information, and the data gathered by the system can be reused at any time to produce statistics, to supervise the performance of the equipment or to avoid having to search for the same information several times. Furthermore, this system learns from its environment. Thousands of equipment units are handled automatically in spite of very different contexts. The appearance and disappearance of elementary systems are handled dynamically during operation, without the intervention of the operator. Finally, the invention makes it possible to reduce the information processing load at the control level.

This object is achieved by the fact that the process for network management comprises at least one submanager (COACH) located in the containing tree between a main manager (AD) and the equipment of the network; the submanager is located in the local area network (RLE), manages a subnetwork, and comprises various modules which communicate with one another and with a main manager (AD) through a kernel (N), the modules polling the equipment of the subnetwork and receiving the alarms triggered by the agents (snmp) operating in the equipment of the subnetwork, the process being composed of several steps:
  a step during which a discovery module (MD) polls all the possible equipment units (ET) of the subnetwork,
  a step for a domain search by the discovery module (MD) when an equipment unit responds to the polling (SNMP), a step during which the discovery module (MD) sends a notification to a model configuration module (MCM), telling it the Internet address (IP) of the equipment unit discovered and the domain to which the unit discovered belongs, a step during which the model configuration module (MCM) notifies an indicator calculation module (MCI) of the indicator to be instantiated in the equipment unit and notifies an alarm filtering module (MFA) of the filter model to be instantiated in the equipment.

According to one characteristic of the invention, the process for network management is characterized in that with each new step for the discovery of the equipment of the subnetwork, the discovery module (MD) updates the databases of the kernel (N) and of the model configuration module (MCM) containing the list of the equipment units and their domains.

According to another characteristic, all of the alarms sent by the various modules are sent to the main manager (AD) via the alarm security module (MSA), said alarm being accompanied by a send message sent to the server of the alarm security module (sMSA).

According to another characteristic, the process for network management is composed of:

a step for the reception of the alarm by the main manager (AD) and the reception of said send message by the server of the alarm security module (sMSA), a step for the sending of a reception confirmation message by the server of the alarm security module (sMSA) to the client of the alarm security module (cMSA), a step for the reception of the reception confirmation message by the client of the alarm security module (cMSA), a step for updating the alarm instances stored in the alarm filtering module (MFA).

According to another characteristic, when the client of the alarm confirmation module (MCA) has not received the reception confirmation message after a given amount of time, it sends the alarm to the main manager (AD), the alarm being accompanied by a send message sent to the server of the alarm security module (sMSA).

According to another characteristic, when the indicator calculation module (MCI) or the ELF discovery module (MD) does not obtain a response to a request sent to an equipment unit of the subnetwork, the indicator calculation module (MCI) or the discovery module (MD) sends a message to a watchdog module (MCG), the watchdog module (MCG) polling the equipment assumed to have disappeared and waiting longer for a response.

According to another characteristic, when after a given amount of time the watchdog module (MCG) has not obtained a response from the equipment unit assumed to have disappeared, the equipment unit is deleted from the database of the kernel (N), from the database of the discovery module (MD) and from the database of the domain configuration module (MCM), the watchdog module (MCG) sending an alarm to the main manager (AD) indicating to it the disappearance of the equipment, the alarm being perceived by the manager as having originated from the equipment unit through the security module and being sent using the security module.

According to another characteristic, when the watchdog module (MCG) obtains a response from the equipment assumed to have disappeared, it requests the rediscovery of the domains if the request was sent by the indicator calculating module.

Another object of the invention is to provide a system for network and system management. This object is achieved by the fact that the system for network management by a main manager communicating with equipment units (ET) through a wide area network (WAN) and local area networks (RLE) is characterized in that it comprises at least one submanager (COACH) located in the local area network (RLE) and managed by the main manager (AD), the submanager (COACH) comprising means for polling the equipment of the local area network (RLE), for filtering and storing the alarms sent by the agents (snmp) operating in the equipment of the network, means for protecting the alarms sent to the main manager (AD) and a dialogue means with the main manager and between the various means.

According to one characteristic of the invention, the dialogue means is constituted by a kernel (N), which dialogues with the main manager (AD) and allows the dialogue between the various modules composing said system.

According to another characteristic, the means for polling the equipment of the local area network (RLE), for filtering and storing the alarms triggered by the agents (snmp) operating in the equipment of the network are constituted by:

a discovery module (MD) that discovers the equipment units (ET) of the subnetwork to be managed and classifies said equipment units into domains as a function of the types of agents installed in them. This discovery module supplements the discovery function of the central manager, providing increased precision, faster discovery and considerable bandwidth economy.

a model configuration module (MCM) comprising alarm filter models and indicators which can be instantiated automatically in the equipment of the subnetwork, each indicator being associated with a polling period, an indicator calculation module (MCI) that calculates the result of the application of an indicator to an equipment unit, the indicator being defined for the domain to which the equipment unit belongs, the result of this application being compared to a threshold value that should not be exceeded a certain number of times, within a certain time period, an alarm filtering module (MFA) that receives the alarms sent by the agents (snmp) operating in the equipment of the subnetwork, then selects some of said alarms using a filter defined for a given domain, said selected alarms being sent to the main manager (AD).

According to another characteristic, the means for protecting the alarms sent to the main manager (AD) are constituted by:

a watchdog module (MCG) which, when requested by a module, verifies the existence of an equipment unit through the repeated sending of calls; if the equipment that has disappeared has not responded to a predefined number of calls, said watchdog module (MCG) sends an alarm to the main manager (AD), which will be perceived by the latter has having originated from the equipment that has disappeared, an alarm security module (MSA) operating according to the client-server mechanism; when at least one alarm has been sent to the manager, the client (cMSA) waits for a confirmation message from the server (sMSA) located in the main manager (AD), said server (sMSA), after receiving said send message, sending a reception confirmation message to the client (cMSA), the client sending the alarm and another send message to the manager when the reception confirmation message has not been received by the client after a given amount of time.

According to another characteristic, when the threshold value has been exceeded a certain number of times within a certain time period, the indicator calculation module (MCI) sends an alarm to the main manager (AD), said alarm being perceived by the main manager as having been sent by the equipment for which the instantiation has been performed.

According to another characteristic, an indicator is an equation applied to object instances in a management information base (MIB), the instances being obtained by polling the agents (SNMP) operating in each of the equipment units of the subnetwork.

According to another characteristic, the result of an indicator and/or a list of the alarms sent can be stored in a file archived in the hard disk.

According to another characteristic, the parameterization of the alarm filters is carried out either by an initialization file or via the snmp protocol.

According to another characteristic, the alarms to be sent are accumulated by the alarm confirmation module so they can be sent, grouped in packets, with a given frequency.

According to another characteristic, an alarm filter model contains a description of the alarm to be recognized and a maximum number of alarm occurrences before which another alarm is sent to the main manager (AD), if said maximum number of alarm occurrences is received within a certain period.

According to another characteristic, the various modules poll the kernel (N) in order to initialize their operating parameters.

According to another characteristic, the kernel (N) manages a database containing all the instances of the management information base (MIB), said kernel comprising at least two communication sockets and a common interface for managing communication with the modules.

According to another characteristic, the initialization parameters of the discovery module (MD) include the period between two discoveries, the minimum number of systems to be discovered and the internet protocol (IP) mask that determines the span of the network to be discovered.

According to another characteristic, an equipment unit (ET) that has been discovered is classified into one or more domains as a function of its responses to the polling performed on each set of object instances of the management information base (MIB) defining a domain.

BRIEF DESCRIPTION OF THE DRAWINGS

Other characteristics and advantages of the present invention will emerge more clearly from the reading of the following description, given in reference to the attached drawings, in which.

DESCRIPTION OF THE PREFERRED EMBODIMENTS

Figure 1:
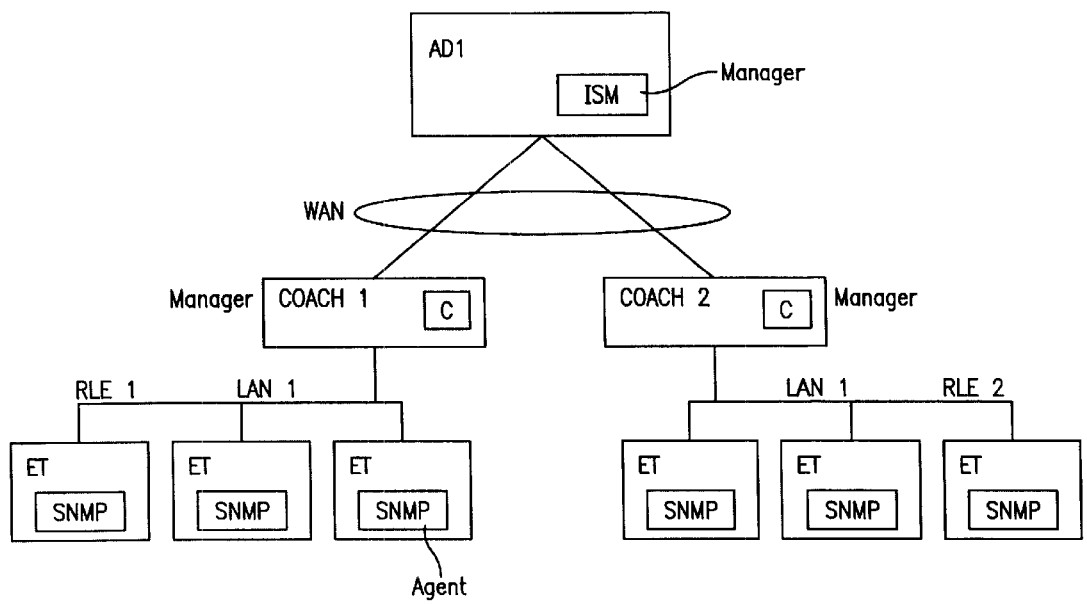
FIG. 1 represents an exemplary implementation of the process for the management of two subnetworks.
Figure 4:
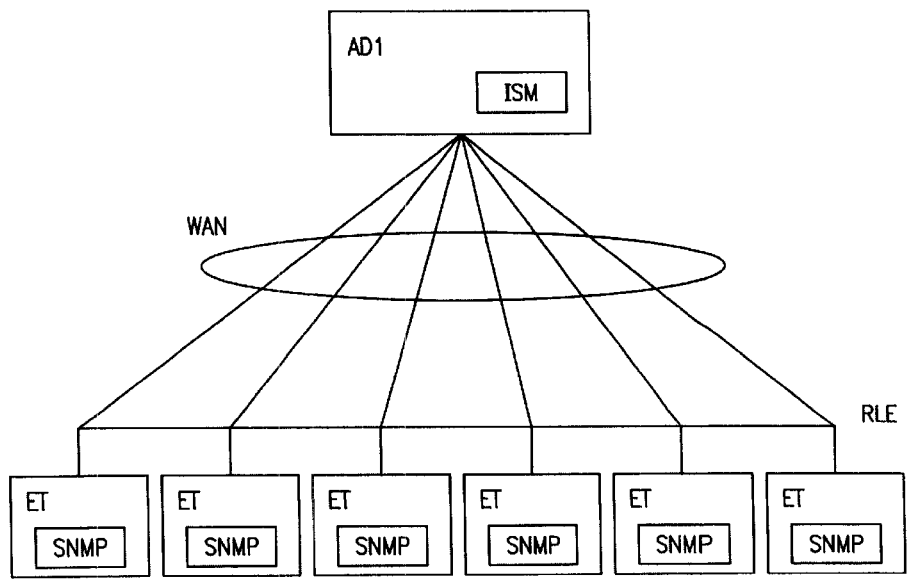
FIG. 4 represents a conventional management system.

The present invention proposes a process and a system for network management that are fully capable of being parameterized remotely via a standard protocol: the protocol SNMP. As shown in FIG. 1, the network management system is composed of a manager (AD) and at least one local area subnetwork (RLE1, RLE2) linked to a Central Open Agent for Concentrated Handling (COACH). The submanager (COACH1) acts at an intermediate management level. Located in the local area network (RLE1), it makes it possible to limit the administrative flow between the main manager (AD) and the equipment units (ET) of the network (RLE1). It is perceived by the equipment units of the network as a manager, and by the manager as an equipment unit.

Figure 2:
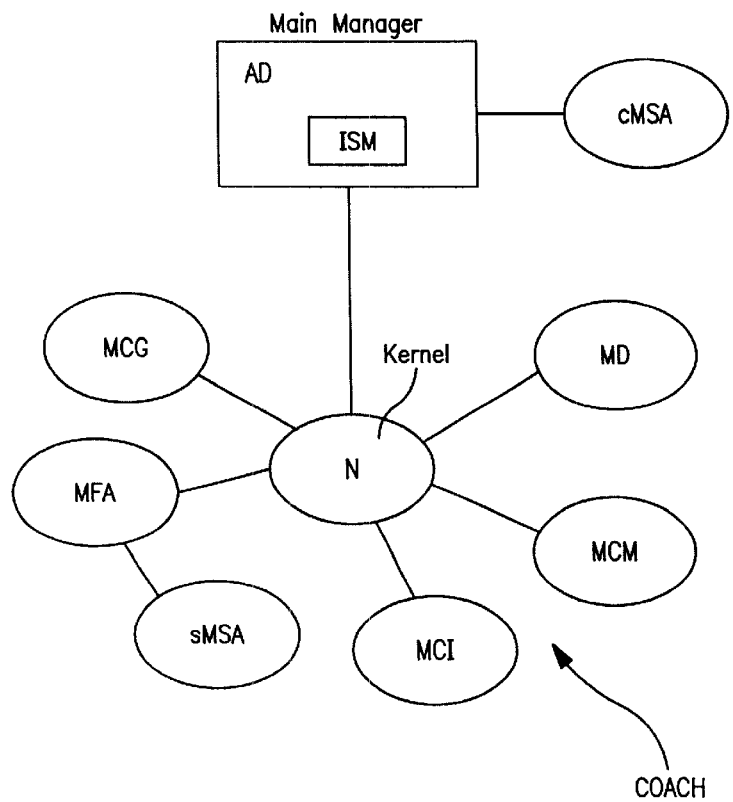
FIG. 2 represents the architecture of the management system.
Figure 3:
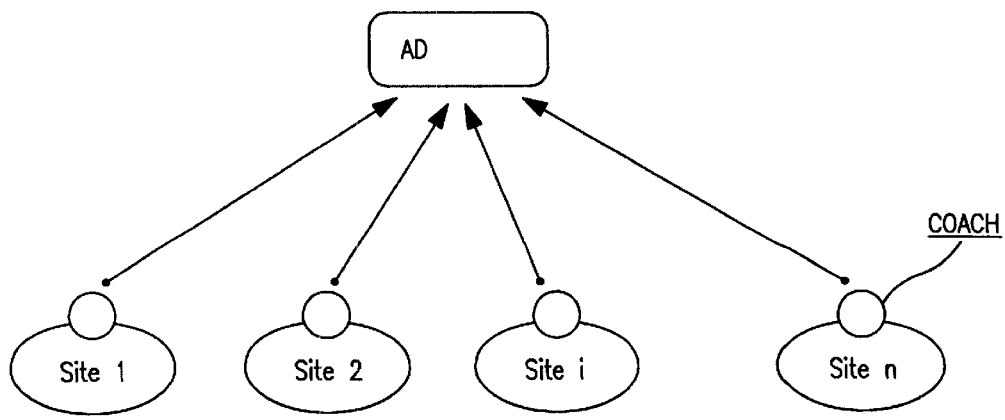
FIG. 3 represents an exemplary implementation of the process for the management of n sites.

The submanager (COACH), as shown in FIG. 2, comprises a set of processes, also known as "modules," which dialogue with one another and with the main manager (AD) by means of a central process, also called a "kernel" (N). The dialogue between the various modules take place through a standard, portable socket. Each module is dedicated to a specific function.

The central module or kernel (N) has two main functions. On the one hand, it dialogues with the manager main (AD), and on the other hand, it manages the dialogue between the various modules composing the submanager (COACH). In effect, the kernel (N) responds to the dialogue (snmp) when the submanager (COACH) is polled or configured by the manager. There are two types of dialogue with the modules, which is why two communication sockets are desirable for managing the kernel-module dialogue. The first type of dialogue is initiated by the kernel and relates to the updating of instances, to requests for information in a management information base (MIB), or to the transmission of notifications originating from another module. The second type of dialogue is initiated by the modules and relates to requests for information or to the updating of instances of the management information base (MIB). The kernel manages two lists of sockets. The creation of sockets in each of these lists takes place dynamically during the connection of the modules. For the dialogue (snmp) with the manager, the standard imposes the use of only one socket. The dialogue takes place through the port 161/udp, but the utilization of a request dispatcher requires the utilization of another parameterizable port in order to have the possibility of running several agents (snmp) on the same equipment unit. In order to simplify the management of communication with the modules, a common interface is defined in the form of a library. Moreover, the kernel (N) has a cache memory (C) containing all of the information resulting from the management of a subnetwork (RLE). Each module polls the kernel in order to initialize these operating parameters. In addition, the kernel (N) manages a data base containing all the instances of the management information base (MIB) of the subnetwork managed by the submanager (COACH).

The discovery module (MD) discovers the subnetwork (RLE1) in which the submanager (COACH11) is installed. Using a table of the Internet Protocol (IP) address masks, the discovery module (MD) determines the addresses (IP) of the equipment units (ET) that the submanager could possibly be managing. Next, the discovery module (MD) successively polls all of the possible equipment in individual Internet packet groups (PING Internet Packet Grouper). A PING is a standard polling that can be used to learn whether a machine is connected to the Internet, to determine the source of a message or to verify whether a system is still active. When an equipment unit is visible in the network, it responds to the PING.

If an equipment unit is discovered, the discovery module (MD) searches for its domain. Each equipment unit belongs to a domain. The domain of each equipment unit makes it possible to define groups of indicators and alarm filters to be injected into each of the equipment units, based on the agents present in these units and hence based on the functions left unfulfilled in each unit.

The domain of an equipment unit is defined based on the unit's response or non-response to a set of object instances of the management information base (MIB snmp). Once a new equipment unit is discovered, a polling is carried out on a set of object instances (snmp). When an equipment unit (ET) that has been discovered responds to the polling of all the object instances defining a domain, it is said that the equipment belongs to this domain. All of the equipment units discovered are classified into domains. These domains make it possible to differentiate between the various types of equipment, and to manage each equipment unit differently based on its domain. An equipment unit can belong to several domains. The domain MIB2, for example, could be defined by the response to the instance "sysUpTimeO". All of the equipment units discovered are polled in this instance. Those that respond belong to at least the domain MIB2.

Finally, when the discovery module (MD) has discovered an equipment unit and its domain, it sends a notification to a model configuration module (MCM), indicating to it the Internet protocol (IP) address of the equipment unit discovered and the domain to which this unit belongs. Advantageously, the discovery module (MD) also sends this same information to the kernel (N), which stores it in a database.

Generally, when an existing system is discovered a second time, its domain is not searched for again. However, the domain of a system can be searched for by setting the instance of the management information base (MIB) related to the discovery of domains to the "active" (ON) state. In this case, if the a domain is not the same as before, the database of the kernel is automatically updated and notifications are automatically sent to the model configuration module (MCM).

When an equipment unit discovered previously no longer responds to an individual PING, the discovery module (MD) sends a notification to a watchdog module (MCG), in order to have it verify whether the equipment has actually disappeared from the network.

As soon as it is connected, the discovery module (MD) polls the kernel (N) in order to learn its initialization parameters:
  the period between two successive discoveries,
  the minimum number of systems to be discovered,
  the Internet protocol (IP) mask that determines the span of the network to be discovered.

The discovery module comprises basic configuration elements, a set of object instances of the management information base (MIB) to be polled and the list of the systems discovered and their domains.

Appendix 7 illustrates a configuration model for the discovery. Appendix 8 shows the dynamic discovery data.

The alarm filtering module (MFA) receives the alarms (traps) sent by the agents (snmp) implemented in the equipment (ET) and filters the alarms to be sent to the main manager (AD). As soon as an alarm is received, this module attempts to recognize the domain to which the equipment unit (ET) that sent this alarm belongs. This information allows it to determine the filter model to be applied to this alarm. An alarm filter model is defined by a description of the alarm to be recognized, (SMNP description fields: company, generic, specific) and by a maximum number of alarm occurrences within a certain period before which another alarm is sent. The choice of filter model is made as a function of the domain to which the equipment sending an alarm belongs. When an alarm is not recognized, it is transmitted to the main manager (AD). In addition, the first alarm instance received is always sent to the main manager (AD). For example, for an equipment unit belonging to the domain "Imprim," i.e., a printer, an alarm model indicating "printer out of paper" is defined. This model is instantiated in all the printers of the subnetwork. The filter model of this alarm is described as a level 0 alarm and is sent to the manager (AD) so that if one of the agents of the printers sends this alarm, the alarm filtering module (MFA) transmits on alarms of such level to the main manager (AD). If these same printers send a failure alarm revealing a "network problem" and the filter module of this alarm is described as having a level 1 in 50 in less than 30 minutes, indicating that an alarm must be retransmitted when fifty alarms are received in less than thirty minutes, the alarm filtering module (MFA) retransmits, for each printer, the first alarm received, then 1 in 50 within a period of 30 minutes. If only two alarms arrive within an interval of at least thirty minutes, they are both transmitted.

The alarm filtering module (MFA) also listens to the kernel (N). The latter sends it notifications of the updating of alarm filter models. The data contained in the alarm filtering module (MFA) are descriptions of the models and information on the instantiation of these modules (date of the first alarm instance received, number of alarms received during the critical period).

Furthermore, the sending of alarms can be archived in a file on the hard disk by using the "set" function, and the manager can retrieve it, for example using a File Transfer Protocol (FTP). The information thus archived relates to the date, the company, and the generic and specific type of an alarm sent. The sending of an alarm can be indicated, for example, in the following form: Nov 19 19:32 1997; 1.3.6.1.4.1.107.144;6;1. This information should be interpreted as follows: "on Nov. 19, 1997, 7:32 pm, a company alarm 1.3.6.1.4.1.107.144 of generic type 6 and specific type 1 was sent to the manager." The sending of alarms can also be archived in a table of alarm masks. Advantageously, all of the information contained in the message can also be archived.

Appendix 2 illustrates an alarm filter model. Appendix 3 shows the dynamic data of an alarm filter.

The indicator calculation module (MCI) calculates indicators on the equipment unit (ET) to be managed. An indicator is an equation into which object instances of a management information base (MIB snmp) are introduced. These object instances are obtained by polling in the agents (snmp) operating in each of the systems to be managed. The result of this equation is compared to a threshold value that must not be exceeded a certain number of times within a given time period. When the threshold value is exceeded a certain number of times within a given time period, an alarm is sent to the main manager (AD).

Take, for example, an indicator to be instantiated in the equipment units of the domain MIB2 comprising a polling period of 60 seconds. This indicator calculates the bandwidth utilization of any network card by using the equation:

$$(8*\$-(ifInOctets.1+ifOutOctets.1)/ifSpeed.1$$

This equation is calculated on each equipment unit of the domain MIB2 every minute. If in the system "A," the result exceeds the value 10 at least twice within 5 minutes, an alarm is sent to the main manager (AD). This alarm is perceived by the latter as having originated from the system "A".

An indicator comprises simple operators such as addition (+), subtraction (−), multiplication (*), and division (/) and set operators. Set operators make it possible to apply an operator to a series of indicator instances. Hence, the operators:

!SUM which produces the sum of a series of indicator instances

!MOY which produces an average of a series of indicators,

!MAX which searches for the maximum value in a series of indicators

!MIN which searches for the minimum value in a series of indicators.

It must be noted that set operators are applied to systems and not to times. Appendix 9 describes several examples of simple equations using set operators. Furthermore, an indicator can also comprise a delta operator notated $-$ and a time indirection indicator notated &. The delta operator is defined such that, at the instant t, $-(x)=x(t)-x(t-T)$, where the attribute x with the value x(t-T) is collected at the instant (t-T) and where the value $-(x)$ indicates the difference between x(t) and x(t-T). $-(x)$ corresponds to a delta and $t to a delta(t). The time indirection operator makes it possible to reuse a calculation already performed on an equipment unit. The instance calculation module (MCI) polls the kernel in order to initialize these operating parameters.

During operation, the model configuration module (MCM) notifies the indicator calculation module (MCI) of the models to be instantiated in the equipment. The data stored in the indicator calculation module (MCI) are the descriptions of the indicator models (with the model names), the instantiations of each of the indicators and operating data such as, for example, the last result of the instance, the date of the next polling of the instance, etc.

The result of the instantiation of the indicators can be archived in a file on the hard disk using the "set" function. The user selects by name the indicators he wishes to log. In this case, the manager can retrieve it using a file transfer protocol (FTP). Likewise, the result of the indicator instantiation is also stored in a table of indicators that is directly accessible through an SNMP request.

The information related to the indicators thus archived includes the date, the model of the indicator polled, the address (IP) of the equipment polled and the result of the calculation of the indicator. An archived file can be indicated, for example, in the following form: Nov 27 11:44 1997;3;129.184.59.7.271.4268. This file should be interpreted as follows: "on Nov. 27, 1997, at 11:44 am, equipment unit 129.184.59.7 was polled in the model 3 and the result was 217.4268.

Advantageously, in order to limit the size of the storage of equations, the character strings corresponding to the polled instances are stored in a table and represented by identifiers.

It must be noted that all of the functions for calculating equations, describing thresholds, and defining the calculation periods, the maximum threshold exceeding frequency and the direction of comparison of the result, are entirely remotely and dynamically configurable via the protocol snmp.

Appendix 5 illustrates an indicator model. Appendix 6 shows the dynamic indicator data.

When an equipment unit no longer responds to the promptings of the discovery module (MD) and the indicator calculation module (MCI), the watchdog module (MCG) verifies whether or not this equipment unit has actually disappeared. In effect, this equipment unit has not necessary been deleted. An equipment unit may no longer be visible during a certain time period due to random events linked to the traffic in the network or because the local area network (RLE) is overloaded. The role of the watchdog module (MCG) is to verify this.

When the discovery module (MD) or the indicator calculation module (MCI) warns the watchdog module (MCG) of the possible disappearance of an equipment unit, the watchdog module (MCG) prompts this unit again, but in a more urgent way. It sends a message to the equipment unit assumed to have disappeared and waits for a response for a very long time. It allows much more time for the equipment to respond. If the equipment responds, the watchdog module (MCG) does not signal anything and by default, the discovery module (MD) and/or the indicator calculation module (MCI) assume that the equipment still exists. If the equipment unit does not respond, the watchdog module sends a new message, allowing the, equipment assumed to have disappeared an even longer response time. After a certain number of messages have been sent, if the equipment assumed to have disappeared still has not responded to the various messages, the watchdog module (MCG) sends an alarm in the direction of the main manager (AD) indicating to it the disappearance of this equipment. This alarm is simulated as having originated from the equipment that has disappeared. This allows the information to be analyzed and simplifies its display at the level of the main manager. The watchdog module (MCG) sends notifications to the discovery module (MD), to the kernel (N) and to the model configuration module (MCM) so that the equipment that has disappeared is deleted from their databases.

When an equipment unit does not respond to the prompting of the indicator calculation module (MCI), but the unit does respond to the polling of the watchdog module, it is possible that certain agents (snmp) have been modified. Therefore, a rediscovery of the domain of this system is requested automatically.

The alarm security module (MSA) makes it possible to protect the alarms sent by the submanager (COACH) to the main manager (AD). This module operates according to a client-server mechanism; the server of the alarm security module (sMSA) is attached to the main manager (AD) and the client of the alarm security module is attached to the alarm filtering module (MFA). When an alarm is sent to the manager, it is always accompanied by a send message sent by the client (cMSA) and addressed to the server (sMSA). The reception of this send message by the server (sMSA) automatically implies that the manager has received the alarm accompanying this message. When the server (sMSA) receives the send message, it sends the client (cMSA) a reception confirmation message. Once the reception confirmation message has been received, the client (cMSA) removes the alarm instances stored in the alarm filtering module (MFA). When after a predetermined time period the client (cMSA) has not received the reception confirmation message, it sends the alarm, accompanied by a new send message, to the main manager. The client (cMSA) repeats this operation until it receives a reception confirmation message.

The confirmation of alarms makes it possible to almost absolutely guarantee the reception of alarms by the manager. Global operation is further improved by a function for sending alarms in groups. The alarm security module (MSA) has the capability of not sending the alarms instantaneously, but archiving them, then sending them in packets with a given frequency. The communication lines are used only during this period. The frequency for sending the alarms is chosen during the parameterization of the alarm security module. This principle is particularly advantageous for lines of the Integrated Services Digital Network (ISDN), for which the opening of a line takes time, and the closing of a line occurs after a delay. Advantageously, in order to further increase the protection of these alarms, the line is open for a few seconds before the alarms are sent.

The model configuration module (MCM) makes it possible to dynamically indicate to the indicator calculation module (MCI) and the alarm filtering module (MFA), the indicators and the alarm filter models to be applied to each of the equipment units (ET) of the subnetwork. When an equipment unit is discovered, the discovery module (MD) sends a notification to the model configuration module (MCM), indicating to it the Internet Protocol address (IP address) of the equipment discovered, as well as the domain to which it belongs. The model configuration module (MCM) then notifies the indicator calculation module (MCI) of the indicator and notifies the alarm filtering module of the filter model.

If, for example, an indicator must be instantiated in the systems MIB2 for all of the systems discovered, the model configuration module (MCM) will indicate the instantiation of this indicator to the indicator calculation module.

The model configuration model (MCM) includes the correspondences between the domains and their (filter and indicator) models.

The model configuration module (MCM) is composed of an initialization part and an update-during-operation part. During the initialization, the existing descriptions of indicators and filter models in the data base of the kernel (N) are destroyed. These descriptions are subsequently read in an initialization file (confmod.ini).

An example of a configuration file (confmod.ini) containing an indicator is described in Appendix 4. An indicator is defined by various fields:

| Field | Definition |
| --- | --- |
| Type: | IND for a an INDicator model |
| Id: | Indicator index (generated automatically) |
| Name: | Name of the indicator |
| Domain: | Grouping of managed equipment units found by their addresses into identifiable domains by means of 5 "Get" requests sent by the submanager (COACH). This means that currently, there are at most 5 possible object identifiers (Oids) for defining a domain. |
| Equation: | Equation of the indicator |
| T polling: | Polling or indicator construction period |
| Threshold: | Decision threshold for the sending of an alarm |
| Appearance: | Number of appearances of the threshold value after which alarms are sent |
| Period: | Period after which the number of appearances of x threshold values is reset to zero |
| Direction of comparison: | Direction of comparison between the threshold defined and the result of the equation for describing an exceeding of same. It could be >, < + or != |
| Indicator log Boolean: | This field makes it possible to create a history (log) of the indicator during the general logging phase. It has the value "LOG" for "log the indicator" or "NLOG" for "never log the indicator." |

An example of a configuration file (confmod.ini) containing an alarm filter model is described in Appendix 1. An alarm filter model is defined by various fields:

| Field | Definition |
| --- | --- |
| Type: | FIL for a FILter model |
| id: | Index of the filter model (generated automatically) |
| Name: | Name of the filter |
| Domain: | Grouping of managed equipment units found by their addresses into identifiable domains by means of 5 "Get" requests sent by the submanager COACH |
| Company: | The "company" field of the alarm to be filtered |

-continued

| Field | Definition |
| --- | --- |
| Generic: | The "generic" field of the alarm to be filtered |
| Specific: | The "specific" field of the alarm to be filtered |
| Appearance: | Number of appearances of the alarm after which an alarm is sent to the manager |
| Period: | Period after which, if no alarms of this type have been received, the number of alarm appearances is reset to zero. |

After initialization, the model configuration module (MCM) polls the kernel in order to learn all of the equipment units discovered as well as their domains. Then, it sends notifications to the alarm filtering module (MFA) and to the indicator calculation module (MCI), indicating to them the models to be instantiated according to the Internet Protocol addresses (IP addresses) of the equipment discovered.

In current operation, the model configuration module (MCM) listens to the communication socket of the kernel and waits for changes. These changes can relate to the addition or deletion of an equipment unit in the network, or to the modification of indicators or filter models.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

APPENDIX 1

```
# SECTION of trap filter descriptions

# Format of the description line
# | Type | name of trap | company | Generic | Specific |
limit on number of traps | period |

#AXA/COACH/unix/trapFilters

FIL 1 alix-fs-nfull @ Bull. 118 6 4 1 60
FIL 2 alix-fs-error 2 1.3.6.1.4.107.114 6 5 100 6
FIL 3 alix-uxLoginSession-setFailed 2 Bull.118 6 33 3 30
FIL 4 trap_attempt_4 1.3.6.1.4.1 107.144 6 7 3 10
FIL 5 trap_attempt_5 1 1.3.6.1.4.107.144.6 8 2 10
FIL 6 alix-fs-nfull 2 Bull.118 6 9 1 60
FIL 7 alix-fs-error 2 Bull.118 6 10 1 60
FIL 8 alix-uxLoginSession-setFailed 2 Bull.118 6 11 3 30
FIL 9 trap_attempt_4 1 1.3.6.1.4.1.107.144 6 12 3 10
FIL 10 trap_attempt_5 1 1.3.6.1.4.1.107.144 6 13 2 10
FIL 11 alix-fs-nfull 2 Bull.118 6 14 1 60
FIL 12 alix_fs_error 2 Bull.118 6 15 1 60
FIL 13 alix-uxLoginSession-setFailed 2 Bull.118 6 133 3 30
FIL 14 trap_attempt_4 1 1.3.6.1.4.1.107.144 6 17 3 10
FIL 15 trap_attempt_5 1 1.3.6.1.4.1.107.144.6 18 2 10
FIL 16 alix-fs-nfull 2 Bull.118 6 19 1 60
FIL 17 alix_fs_error 2 Bull.118 6 20 1 60
FIL 18 alix-uxLoginSession-SetFailed 2 Bull. 118 6 211 3 30
FIL 19 trap_attempt_4 1 1.3.6.1.4.1.107.144 6 212 3 10
FIL 20 trap_attempt_5 1 1.3.6.1.4.1.107.144 6 213 2 10
FIL 21 alix-fs-nfull 2 Bull. 118 6 24 1 60
FIL 22 alix-fs-error 2 Bull. 118 6 25 1 60
FIL 23 alix-uxLoginSession-setFailed 2 Bull.118 6 233 3 30
FIL 24 trap_attempt_4 1 1.3.6.1.4.1.107.144 6 27 3 10
FIL 25 trap_attempt_5 1 1.3.6.1.4.1.107.144 6 28 2 10
FIL 26 alix-fs-nfull 2 Bull.118 6 29 1 60
FIL 27 alix-fs-error 2 Bull 118 6 30 1 60
FIL 28 alix-uxLoginSession-setFailed 2 Bull.118 6 311 3 30
FIL 29 trap_attempt_4 1 1.3.6.1.4.1.107.144.6 312 3 10
FIL 30 trap_attempt_5 1 1.3.6.1.4.1.107.144 6 313 2 10
```

APPENDIX 2

```
-- Models of filters
cfgFilterTable OBJECT-TYPE
  SYNTAX SEQUENCE OF CfgFilterEntry
  ACCESS not-accessible
  STATUS mandatory
  DESCRIPTION
    "Configuration table of the filter models."
  ::= { CoachCig 2 }
cfgFilterEntry OBJECT-TYPE
  SYNTAX CfgFilterEntry
  ACCESS not-accessible
  STATUS mandatory
     DESCRIPTION
       "An entry (line) in the table of filter models."
     INDEX { cfgFilterId }
     ::= { cfgFilterTable 1 }
CfgFilterEntry ::=
  SEQUENCE {
    cfgFilterId
      INTEGER,
    cfgFilterLabel
      BYTE STRING,
    cfgFilterDomain
      INTEGER,
    cfgFilterCompany
      OBJECT IDENTIFIER,
    cfgFilterGeneric
      INTEGER,
    cfgFilterSpecific
      INTEGER,
    cfgFilterCptMax
      INTEGER
    cfgFilterPeriodValid
      INTEGER
  }
cfgFilterId OBJECT-TYPE
  SYNTAX INTEGER
  ACCESS read-only
  STATUS mandatory
  DESCRIPTION
    "The value of this attribute uniquely identifies an entry in the table
    of filter models."
  ::= { cfgFilterEntry 1 }
cfgFilterLabel OBJECT-TYPE
  SYNTAX BYTE STRING
  ACCESS read-write
  STATUS mandatory
  DESCRIPTION
    "Textual description of a filter model."
  ::= { cfgFilterEntry 2 }
cfgFilterDomain OBJECT-TYPE
  SYNTAX INTEGER
  ACCESS read-write
  STATUS mandatory
  DESCRIPTION
    "Identifier of the domain to which the filter model    belongs."
  ::= { cfgFilterEntry 3 }
cfgFilterCompany OBJECT-TYPE
  SYNTAX BYTE STRING
  ACCESS read-write
  STATUS mandatory
  DESCRIPTION
    "Object Identifier of the Company of the trap."
  ::= { cfgFilterEntry 4 }
cfgFilterGeneric OBJECT-TYPE
  SYNTAX INTEGER
  ACCESS read-write
  STATUS mandatory
  DESCRIPTION
    "Generic number of the trap."
  ::= { cfgFilterEntry 5 }
cfgFilterSpecific OBJECT-TYPE
  SYNTAX INTEGER
  ACCESS read-write
  STATUS mandatory
  DESCRIPTION
    "Specific number of the trap."
  ::= { cfgFilterEntry 6 }
cfgFilterCptMax OBJECT-TYPE
```

APPENDIX 2-continued

```
  SYNTAX INTEGER
  ACCESS read-write
  STATUS mandatory
  DESCRIPTION
    "Number of times the trap must be received during
    <cfgFilterPeriodValid> for it to be transmitted."
  ::= { cfgFilterEntry 7 }
cfgFilterPeriodValid OBJECT-TYPE
  SYNTAX INTEGER
  ACCESS read-write
  STATUS mandatory
  DESCRIPTION
    "Period (in seconds) during which the trap must be received
    <cfgFilterCptMax> times in order to be transmitted."
  ::= { cfgFilterEntry 8 }
```

APPENDIX 3

```
-- Filter data
filterTable OBJECT-TYPE
  SYNTAX SEQUENCE OF FilterEntry
  ACCESS not-accessible
  STATUS mandatory
  DESCRIPTION
    "Table associating a filter model with a machine."
  ::= { CoachData 2 }
filterEntry OBJECT-TYPE
  SYNTAX FilterEntry
  ACCESS not-accessible
  STATUS mandatory
  DESCRIPTION
    "An entry (line) in the filter table."
  INDEX { filterId,filterIpAddress }
  ::= { filterTable 1 }
FilterEntry ::=
  SEQUENCE {
    filter ID
      INTEGER
    filterIpAddress
      IpAddress
  }
filterId OBJECT-TYPE
  SYNTAX INTEGER
  ACCESS read-only
  STATUS mandatory
  DESCRIPTION
    "Identifier of the filter (the same as <cfgFilterId>);
    the value of this attribute uniquely identifies with <filterIpAddress>
    an entry in the filter table."
  ::= { filterEntry 1 }
filterIpAddress OBJECT-TYPE
  SYNTAX IpAddress
  ACCESS read-only
  STATUS mandatory
  DESCRIPTION
    "IP address of the machine sending the trap;
    the value of this attribute uniquely identifies with <filterId>
    an entry in the filter table."
                    ::= { filterEntry 2 }
```

APPENDIX 4

```
# SECTION of indicator descriptions

#type:         IND | FIL, respectively INDicators or FILter
# Id:          indicator index (generated automatically)
# Name:        name of the indicator
# Domain:      grouping of managed systems found by their addresses
               into identifiable domains by means of 5 get requests
               sent by COACH
# Equation:    equation of the indicator
# T polling:   polling or indicator construction period
# Threshold:   decision threshold for the sending of a trap
```

APPENDIX 4-continued

```
# Appearance:  number of appearances of the threshold value after
               which traps are sent
# Period:      period in which the x threshold values appear
# Direction of direction of comparison between the threshold and the
comparison:    result
# Log:         indicates whether or not the indicator must be logged

# Format of the description line
# | type | Id | Name | Domain | Equation | T polling | threshold | x times |
in T seconds | direction of the test | log

# AXA/COACH/internet/indicators

#% of bandwidth utilization in the interface
IND 1 ifUtilizationBandWidth2(((8 * $(ifInOctets.1 + ifOutOctets.1))/
$t)/ifSpeed.1) * 100 600 10 1 1200 > LOG
# % utilization of the bandwidth in the segment
IND 2 ifUtilizationBandWidthAll 3 | SUM(ifUtilizationBandWidth)
1210 10 1 3 3600 > LOG
# Input and output packet discard rate
IND 3 ifDiscards 2 $-(ifInDiscards.1 + ifOutDiscards.1)
120 1 1 120 > LOG
# Sum of the input and output packet discard rates in the segment
IND 4ifDiscardsAll 3 | SUM(ifDiscards)320 3 1 320 > LOG
# Length of the queue of outgoing packets in the interface
IND 5 coachIfOutQlen 2 ifOutQLen 1 330 5 1 330 > LOG
# Sum of the lengths of the queues of outgoing packets
in all the interfaces of the segment
IND 6 coachIfOutQLenAll 3 | SUM(coachIfOutQLen)
670 50 1 670 > LOG
# Number of packets retransmitted to the interface
IND 7 coachcpRetransSegs 2 tcpRetransSegs. 0 340 5 1 340 > LOG
# Error rate in the interface
IND 8 iferrors 2 ($(ifInErrors.1 + ifOutErrors.1)$t) 290 5 1 290 > LOG
# Error rate in the segment
IND 9 ifErrorsSUM 3 !SUM(ifErrors) 620 2 1 620 > LOG
# Average error rate in all the interfaces of the segment
IND 10 ifErrors MOY 3 (!MOY(ifErrors)*100) 630 > LOG
# Input and output unicast rate in the interface
IND 11 ifUcastPackets 2 (ifInUcastPkts.1 +
ifOutUcastPkts.1)$t 280 5 1 280 > LOG
# Input and output multicast rate in the interface
IND 12 if NUPackets 2 (ifInNUcastPkts.1 +
ifOutNUcastPkts.1)$t280 5 1 280 > NLOG
# % of errors in the interface relative to the total packets sent or received
IND 13 ifErrorsRatio 2 (&ifErrors/(&ifInPackets +
&ifOutPackets)) * 100 570 5 1570 > NLOG
# average % in the segment of the errors in all
the interfaces of the segment
IND 14 ifErrorsRatioLinkMOY 3 !MOY(ifErrorsRatio)
1220 5 1 1220 > LOG
# % Sum of percentages of errors in all the interfaces of the links
IND 15 IfErrorsRatioLinkSUM 3 !SUM(ifErrorsRatio)
1220 20 1 1220 > LOG
# Quantity of header and address errors in the interface.
Used to calculate ipInputErrorsPercent
IND 16 ipInputErrors 2$-(ipInHdrErrors.0 + ipInAddrErrrs.0)
650 5 1 650 > LOG
# % of header and address errors in the interface
IND 17 ipInputErrorsPercent 2 (&ipInputErrors/
($(ipInDelivers.0))) * 100 650 5 1 650 > LOG
# Sum of the header and address error percentages in the interface
IND 18 ipInputErrorsPercentOnLink 3 !SUM(ipInputErrorsPercent)
300 5 1 300 > LOG
# Unavailability of a machine
IND 19 NoAvailability 2-$t($-(sysUpTime.0)) 100 1 1 300 > LOG
# Sum of the unavailablity for all of the machines of the segment
IND 20 NoAvailabiltyOnLink 3 !SUM(NoAvailability)
150 100 1 300 > LOG
# 10/21/97 20:17 file: CONFMOD.DOC#version DRAFT
```

APPENDIX 5

```
Coach-MIB DEFINITIONS ::= BEGIN
bull            OBJECT IDENTIFIER ::= { companies 107 }
gam             OBJECT IDENTIFIER ::= { bull 146 }
```

APPENDIX 5-continued

```
Coach       OBJECT IDENTIFIER ::= {gam 1 }
CoachCfg              OBJECT IDENTIFIER ::= { Coach 1 }
CoachData             OBJECT IDENTIFIER ::= { Coach 2 }
CoachSystem       OBJECT IDENTIFIER ::= { Coach 3 }
-- ============================================
-- Configuration of Coach
-- ============================================
-- Indicator models
cfgIndicatorTable OBJECT-TYPE
  SYNTAX SEQUENCE OF CfgIndicatorEntry
  ACCESS not-accessible
  STATUS mandatory
  DESCRIPTION
    "Configuration table of the indicator models."
  ::= { CoachCfg 1 }
cfgIndicatorEntry OBJECT-TYPE
  SYTAX CfgIndicatorEntry
  ACCESS not-accessible
  STATUS mandatory
  DESCRIPTION
    "An entry (line) in the table of indicator models."
  INDEX { cfgIndicatorId }
  ::= {cfgIndicatorTable 1 }
ComparisionType ::= INTEGER {equal(0),less(1),greater(2)}
CfgIndicatorEntry ::=
  SEQUENCE {
    cfgIndicatorId
       INTEGER,
    cfgIndicatorLabel
       BYTE STRING,
    cfgIndicatorDomain
       INTEGER,
    cfgIndicatorEquation
       BYTE STRING,
    cfgIndicatorPeriodPolling
       INTEGER,
    cfgIndicatorThreshold
       INTEGER,
    cfgIndicatorCptMax
       INTEGER,
    cfgIndicatorPeriodValid
       INTEGER,
    cfgIndicatorComparison
       ComparisonType
  }
cfgIndicatorId OBJECT-TYPE
  SYNTAX INTEGER
  ACCESS read-only
  STATUS mandatory
  DESCRIPTION
    "The value of this attribute uniquely identifies an entry in
    the table of indicator models."
  ::= { cfgIndicatorEntry 1 }
cfgIndicatorLabel OBJECT-TYPE
  SYNTAX BYTE STRING
  ACCESS read-write
  STATUS mandatory
  DESCRIPTION
    "Textual description of an indicator model."
  ::= { cfgIndicatorEntry 2 }
cfgIndicatorDomain OBJECT-TYPE
  SYNTAX INTEGER
  ACCESS read-write
  STATUS mandatory
  DESCRIPTION
    "Identifier of the domain to which the indicator model belongs."
  ::= { cfgIndicatorEntry 3 }
cfgIndicatorEquation OBJECT-TYPE
  SYNTAX BYTE STRING
  ACCESS read-write
  STATUS mandatory
  DESCRIPTION
    "Arithmetic equation describing the indicator model."
  ::= { cfgIndicatorEntry 4 }
cfgIndicatorPeriodPolling OBJECT-TYPE
  SYNTAX INTEGER
  ACCESS read-write
  STATUS mandatory
```

APPENDIX 5-continued

```
DESCRIPTION
    "Period (in seconds) in which the indicator will be calculated."
    ::= { cfgIndicatorEntry 5 }
cfgIndicatorThreshold OBJECT-TYPE
    SYNTAX INTEGER
    ACCESS read-write
    STATUS mandatory
    DESCRIPTION
        "Threshold which the indicator must exceed
        <cfgIndicatorCptMax> times during
        <cfgIndicatorPeriodValid> in order for an alarm to be sent."
    ::= { cfgIndicatorEntry 6 }
cfgIndicatorCptMax OBJECT-TYPE
    SYNTAX INTEGER
    ACCESS read-write
    STATUS mandatory
    DESCRIPTION
        "Number of times the indicator must exceed
        <cfgIndicatorThreshold> during
        <cfgIndicatorPeriodValid> in order for an alarm to be sent."
    ::= { cfgIndicatorEntry 7 }
cfgIndicatorPeriodValid OBJECT-TYPE
    SYNTAX INTEGER
    ACCESS read-write
    STATUS mandatory
    DESCRIPTION
        "Period (in seconds) during which the indicator must
        exceed <cfgIndicatorCptMax>
        <cfgIndicatorThreshold> times in order for an alarm to be sent."
    ::= { cfgIndicatorEntry 8 }
cfgIndicatorComparision OBJECT-TYPE
    SYNTAX ComparisonType
    ACCESS read-write
    STATUS mandatory
    DESCRIPTION
        "Comparison type between the threshold "cfgIndicatorThreshold"
        and the result of the equation <indicatorResult>."
    ::= { cfgIndicatorEntry 9 }
```

APPENDIX 6

```
-- Indicator data
indicatorTable OBJECT-TYPE
    SYNTAX SEQUENCE OF IndicatorEntry
    ACCESS not-accessible
    STATUS mandatory
    DESCRIPTION
        "Table of results of indicator calculations."
    ::= { CoachData 1 }
indicatorEntry OBJECT-TYPE
    SYNTAX IndicatorEntry
    ACCESS not-accessible
    STATUS mandatory
    DESCRIPTION
        "An entry (line) in the table of indicators."
    INDEX { indicatorId, indicatorIpAddress }
    ::= { indicatorTable 1 }
IndicatorEntry ::=
    SEQUENCE {
        indicatorId
            INTEGER,
        indicatorIpAddress
            IpAddress,
        indicatorResult
            INTEGER
    }
indicatorId OBJECT-TYPE
    SYNTAX INTEGER
    ACCESS read-only
    STATUS mandatory
    DESCRIPTION
        "Identifier of the indicator (the same as <cfgIndicatorId>);
        the value of this attribute uniquely identifies with
        <indicatorIpAddress> an entry in the indicator table."
    ::= { indicatorEntry 1 }
indicatorIpAddress OBJECT-TYPE
```

APPENDIX 6-continued

```
    SYNTAX IpAddress
    ACCESS read-only
    STATUS mandatory
    DESCRIPTION
        "IP address of the machine in which the indicator is calculated;
        the value of this attribute uniquely identifies with <indicatorId>
        an entry in the indicator table."
    ::= { indicatorEntry 2 }
indicatorResult OBJECT-TYPE
    SYNTAX INTEGER
    ACCESS read-only
    STATUS mandatory
    DESCRIPTION
        "Result of the indicator calculation."
    ::= { indicatorEntry 3 }
```

APPENDIX 7

```
-- Configuration of the discovery
cfg Discovery        OBJECT IDENTIFIER::={ CoachCfg 4 }
cfgDiscoverPeriod OBJECT-TYPE
    SYNTAX INTEGER
    ACCESS read-write
    STATUS mandatory
    DESCRIPTION
        "Period (in seconds) in which a discovery is triggered."
    ::= { cfgDiscovery 1 }
cfgDiscoverPeriodICMP OBJECT-TYPE
    SYNTAX INTEGER
    ACCESS read-write
    STATUS mandatory
    DESCRIPTION
        "Period (in seconds) of the reinforced ICMP."
    ::= { cfgDiscovery 2 }
cfgDiscoverBroadcast OBJECT-TYPE
    SYNTAX IpAddress
    ACCESS read-write
    STATUS mandatory
    DESCRIPTION
        "Broadcast address of the subnetwork."
    ::= { cfgDiscovery 3 }
cfgDiscoverDomainAtNextTime OBJECT-TYPE
    SYNTAX INTEGER {
        yes (1),
        no (2)
    }
    ACCESS read-write
    STATUS mandatory
    DESCRIPTION
        "Whether or not to rediscover the domains at the next Discovery."
    ::= { cfgDiscovery 4 }
cfgDiscoverMaxDisc OBJECT-TYPE
    SYNTAX INTEGER
    ACCESS read-write
    STATUS mandatory
    DESCRIPTION
        "Maximum number of wrong discoveries."
    ::= { cfgDiscovery 5 }
cfgDiscoverMaxICMP OBJECT-TYPE
    SYNTAX INTEGER
    ACCESS read-write
    STATUS mandatory
    DESCRIPTION
        "Maximum number of wrong ICMP responses."
    ::= { cfgDiscovery 6 }
cfgDiscoverMinMachine OBJECT-TYPE
    SYNTAX INTEGER
    ACCESS read-write
    STATUS mandatory
    DESCRIPTION
        "Minimum number of machines in the subnetwork."
    ::= { cfgDiscovery 7 }
cfgDiscoverTimeOut OBJECT-TYPE
    SYNTAX INTEGER
    ACCESS read-write
    STATUS mandatory
```

APPENDIX 7-continued

```
DESCRIPTION
    "Time_out of the ICMP send."
::= { cfgDiscovery 8 }
cfgDiscoverTimeOutICMP OBJECT-TYPE
    SYNTAX INTEGER {
        yes (1),
        no (2)
        }
    ACCESS read-write
    STATUS mandatory
    DESCRIPTION
        "ICMP policy reinforced when time_out exceeded."
::= { cfgDiscovery 9 }
```

APPENDIX 8

```
-- Discovery data
discoverTable OBJECT-TYPE
    SYNTAX SEQUENCE OF DiscoverEntry
    ACCESS not-accessible
    STATUS mandatory
    DESCRIPTION
        "Discovery table of the machines managed by Coach."
    ::= { CoachData 3 }
discoverEntry OBJECT-TYPE
    SYNTAX DiscoverEntry
    ACCESS not-accessible
    STATUS mandatory
    DESCRIPTION
        "An entry (line) in the discovery table."
    INDEX { discoverIpAddress }
::= { discoverTable 1 }
DiscoverEntry ::=
    SEQUENCE {
        discoverIpAddress
                IpAddress,
        discoverDomainId
                INTEGER
        }
discover IpAddress OBJECT-TYPE
    SYNTAX IpAddress
    ACCESS read-write
    STATUS mandatory
    DESCRIPTION
        "IP address of the machine; the value of this attribute uniquely
        identifies an entry in the discovery table."
    ::= { discoverEntry 1 }
discoverDomainId OBJECT-TYPE
    SYNTAX INTEGER
    ACCESS read-write
    STATUS mandatory
    DESCRIPTION
        "Identifier of the domain to which the machine belongs."
    ::= { discoverEntry 2 }
```

APPENDIX 9

| | |
|---|---|
| Xe = !SUM(A) | The sum X1 is performed on all the instances A calculated by COACH.<br>The result: X1 = A1 + A2 + A3 + A4 |
| X2 = !MOY(A) − !MOY(B) +<br>!SUM(C) | The result:<br>X2 = (A1 + A2 + A3 + A4)/4 +<br>(B1 + B2 + B3 + B4)/4 +<br>(C1 + C2 + C3 + C4) |
| X3 = !MOY(A) − !MOY(B) | The result:<br>X3 = (A1 + A2 + A3 + A4)/4 −<br>(B1 + B2 + B3 + B4)/4 |
| X4 = !MAX(C) | The result is the maximum value of the values of the indicators C in all the machines in which this indicator has been instantiated.<br>X4 = MAX5C1, C2, C3, C4) |

APPENDIX 9-continued

| | |
|---|---|
| X5 = !MIN(C) | The result is the minimum value of the values of the indicators C in all the machines in which this indicator has been instantiated. |
| X5 = MIN(C1, C2, C3, C4) | |

What is claimed is:

1. A process for network and system management, said network having at least one submanager (COACH) located in a containing tree between a main manager (AD) and equipment units (ET) of a subnetwork, each having an Internet address, the submanager (COACH) being located in a local area network (RLE) for managing the subnetwork and comprising various modules adapted to communicate with one another and with the main manager (AD) through a kernel (N), the modules being arranged to poll the equipment units (ET) of the subnetwork and receive alarms triggered by agents (SNMP) operating in the equipment units of the subnetwork (ET), the process comprising:

polling all of the possible equipment units (ET) of the subnetwork by a discovery module (MD), that discovers the equipment units (ET) of the subnetwork to be managed and classifies said equipment units into domains as a function of the types of agents installed in them, a domain being a group of equipment units, and being defined based on the unit's response or non-response to a set of object instances of a management information base (MIB SNMP), completing a domain search by the discovery module (MD), when an equipment unit responds to the polling (SNMP), sending a notification to a model configuration module (MGM) by the discovery module (MD), noting to the model configuration module (MCM) the Internet address (IP) of the equipment unit discovered and the domain to which the equipment unit discovered belongs, and notifying an indicator calculation module (MCI) by the model configuration module (MCM) of an indicator to be instantiated in the equipment unit and an alarm filtering module (MFA) of a filter model to be instantiated in the equipment.

2. A process for network and system management according to claim 1, further comprising:

updating the databases of the kernel (N) and of the model configuration module (MCM) containing a list of the equipment units and their domains by the discovery module (MD) with each discovery of an equipment unit of the subnetwork, wherein the model configuration module (MCM) comprises alarm filter models and indicators adapted to be instantiated automatically in the equipment of the subnetwork, each indicator being associated with a polling period.

3. A process for network and system management according to claim 1, further comprising:

sending alarms by the various modules which communicate with one another to the main manager (AD) via an alarm security module (MSA) having a client (cMSA), said alarms being accompanied by a send message addressed to a server of the alarm security module (sMSA) and storing said alarm in an alarm filtering module (MFA), wherein the alarm security module (MSA) operates according to a client-server response such that when at least one alarm has been sent to the manager, the client (cMSA) waits for a confirmation message from the server (sMSA) located in the main manager (AD), said server (sMSA), after receiving said send message, sending a reception confirmation message to the client (cMSA), the client sending the alarm and another send message to the manager when the reception confirmation message has not been received by the client after a given amount of time.

4. A process for network and system management according to claim 3, further comprising:

receiving an alarm by the main manager (AD) and said send message by the server of the alarm security module (sMSA), sending a reception confirmation message by the server of the alarm security module (sMSA) to the client of the alarm security module (cMSA), receiving the reception confirmation message by the client of the alarm security module (cMSA), and updating alarm instances stored in the alarm filtering module (MFA).

5. A process for network and system management according to claim 3, further comprising monitoring the reception of the confirmation message by a client of an alarm confirmation module (MCA) and when the client of the alarm confirmation module (MCA) has not received the reception confirmation message after a given amount of time, sending an the alarm to the main manager (AD), the alarm being accompanied by a send message sent to the server of the alarm security module (sMSA).

6. A process for network and system management according to claim 1, characterized in that when an indicator calculation module (MCI) or the discovery module (MD) does not obtain a response to a request sent to an equipment unit of the subnetwork, the indicator calculation module (MCI) or the discovery module (MD) sends a message to a watchdog module (MCG) to indicate an assumed disappearance of the equipment unit and polling the equipment unit assumed to have disappeared by the watchdog module and waiting a further predetermined amount of time for a response, wherein the Watchdog module (MCG), when requested by a module, verifying the existence of an equipment unit through the repeated sending of calls, and if the existence of an equipment unit is not verified that the equipment unit has disappeared and has not responded to a predefined number of calls, sending an alarm to the main manager (AD), which will be perceived by the latter as having originated from the equipment unit that has disappeared.

7. A process for network and system management according to claim 6, characterized in that when, after a given amount of time, the watchdog module (MCG) has not obtained a response from the equipment unit assumed to have disappeared, the equipment unit of the subnetwork assumed to have disappeared is deleted from the database of the kernel (N), from the database of the discovery module (MD) and from the data base of the domain configuration module (MCM), the watchdog module (MCG) sending an alarm to the main manager (AD), indicating to it the disappearance of the equipment, the alarm being perceived by the manager as having originated from the equipment unit through the security module and being sent using the security module.

8. A process for network and system management according to claim 6, characterized in that when the watchdog module (MCG) obtains a response from the equipment unit assumed to have disappeared, it requests rediscovery of the domains if the request was sent by the indicator calculation module (MCI).

9. A process for network and system management according to claim 1, wherein the indicator calculation module (MCI) calculates the result of the application of an indicator to an equipment unit, the indicator being defined for the domain to which the equipment unit belongs, and the result of this application being compared to a threshold value not exceeded by a certain number of times within a certain time period.

10. A. process for network and system management according to claim 1, in which the alarm filtering module (MFA) receives the alarms sent by the agents (SNMP) operating in the equipment of the subnetwork, and then selects some of said alarms using a filter defined for a given domain, said selected alarms being sent to the main manager (AD).

11. A process for network and system management according to claim 1, further comprising:

updating the databases of the kernel (N) and of the model configuration module (MCM) containing a list of the equipment units and their domains by the discovery module (MD) with each discovery of an equipment unit of the subnetwork.

12. A process for network and system management according to claim 1, further comprising:

sending alarms by the various modules which communicate with one another to the main manager (AD) via an alarm security module (MSA) having a client (cMSA), said alarms being accompanied by a send message addressed to a server of the alarm security module (sMSA) and storing said alarm in an alarm filtering module (MFA).

13. A process for network and system management according to claim 1, characterized in that when an indicator calculation module (MCI) or the discovery module (MD) does not obtain a response to a request sent to an equipment unit of the subnetwork, the indicator calculation module (MCI) or the discovery module (MD) sends a message to a watchdog module (MCG) to indicate an assumed disappearance of the equipment unit and polling the equipment unit assumed to have disappeared by the watchdog module and waiting a further predetermined amount of time for a response.

14. A system for network and system management by a main manager communicating with equipment units (ET) of local area networks (RLE) through a wide area network (WAN) comprising:

at least one submanager (COACH) located in the local area network (RLE) and managed by the main manager (AD), wherein the submanager (COACH) includes means for polling the equipment units of the local area network (RLE), for filtering and storing alarms triggered by agents (SNMP) operating in the equipment units of the local area networks, means for protecting the alarms sent to the main manager (AD), and means for maintaining a dialogue with the main manager and between the means for polling and means for protecting the alarms, wherein the polling means includes a discovery module (MD) that discovers the equipment units (ET) of the subnetwork to be managed and classifies said equipment units into domains as a function of the types of agents installed in them, and wherein a domain is a group of equipment units and is defined based on the unit's response or non-response to a set of object instances of a management information base (MIB SNMP).

15. A system for network and system management according to claim 14, characterized in that the dialogue means is constituted by a kernel (N), which dialogues with the main manager (AD) and allows the dialogue between the various modules composing said system.

16. A system for network and system management according to claim 15, characterized in the kernel (N) is polled by the modules in order to initialize their operating parameters.

17. A system for network and system management according to claim 14, characterized in that the means for polling the equipment of the local area network (RLE), for filtering and storing the alarms triggered by the agents (SNMP) operating in the equipment of the network comprise:

a model configuration module (MCM) comprising alarm filter models and indicators adapted to be instantiated automatically in the equipment of the subnetwork, each indicator being associated with a polling period, an indicator calculation module (MCI) that calculates the result of the application of an indicator to an equipment unit, the indicator being defined for the domain to which the equipment unit belongs, the result of this application being compared to a threshold value not exceeded by a certain number of times within a certain time period, and an alarm filtering module (MFA) that receives the alarms sent by the agents (SNMP) operating in the equipment of the subnetwork, and then selects some of said alarms using a filter defined for a given domain, said selected alarms being sent to the main manager (AD).

18. A system for network and system management according to claim 17, characterized in that when the threshold value has been exceeded a certain number of times within a given time period, the indicator calculation module (MCI) sends an alarm to the main manager (AD), said alarm being perceived by the main manager as having been sent by the equipment unit for which the instantiation has been performed.

19. A system for network and system management according to claim 17, characterized in that the indicator is an equation applied to object instances in the management information base (MIB), the instances being obtained by polling the agents (SNMP) operating in each of the equipment units of the subnetwork.

20. A system for network and system management according to claim 14, characterized in that the kernel (N) manages a database containing all the instances of the management information base (MIB), said kernel comprising at least two communication sockets and common interface for managing communication with the modules.

21. A system for network and system management according to claim 17, further including a file archived on the hard disk for storing the result of an indicator and/or a list of the alarms sent.

22. A system for network and system management according to claim 14, characterized in that the means for protecting the alarms sent to the main manager (AD) comprise:

a watchdog module (MCG) which, when requested by a module, verifies the existence of an equipment unit through the repeated sending of calls; and if the existence of an equipment unit is not verified that the equipment unit has disappeared and has not responded to a predefined number of calls, said watchdog module (MCG) sends an alarm to the main manager (AD), which will be perceived by the latter as having originated from the equipment unit that has disappeared, an alarm security module (MSA) that operates according to a client-server response such that when at least one alarm has been sent to the manager, the client (cMSA) waits for a confirmation message from the server (sMSA) located in the main manager (AD), said server (sMSA), after receiving said send message, sending a reception confirmation message to the client (cMSA), the client sending the alarm and another send message to the manager when the reception confirmation message has not been received by the client after a given amount of time.

23. A system for network and system management according to claim 14, further including alarm filters that are parameterized either by an initialization file or via the protocol SNMP.

24. A system for network and system management according to claim 14, further including an the alarm confirmation module for accumulating alarms to be sent, said alarms being grouped in packets, with a given frequency.

25. A system for network and system management according to claim 14, wherein the alarm filter module (MFN) contains a description of the alarm to be recognized and a maximum number of alarm occurrences before which another alarm is sent to the main manager (AD), if said maximum number of alarm occurrences is received within a certain period.

26. A system for network and system management according to claim 14, characterized in that initialization parameters of the discovery module (MD) include the period between two discoveries, a minimum number of systems to be discovered and an Internet protocol (IP) mask that determines the span of the network to be discovered.

27. A system for network and system management according to claim 14, characterized in that an equipment unit (ET) that has been discovered is classified into one or more domains as a function of its responses to the polling performed on each set of object instances of the management information base (MIB) defining a domain.

* * * * *